United States Patent
Polegato Moretti

(10) Patent No.: US 9,486,033 B2
(45) Date of Patent: Nov. 8, 2016

(54) VAPOR-PERMEABLE SHOE

(75) Inventor: Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 944 days.

(21) Appl. No.: 13/393,090

(22) PCT Filed: Aug. 4, 2010

(86) PCT No.: PCT/EP2010/061345
§ 371 (c)(1),
(2), (4) Date: Feb. 28, 2012

(87) PCT Pub. No.: WO2011/023507
PCT Pub. Date: Mar. 3, 2011

(65) Prior Publication Data
US 2012/0151806 A1    Jun. 21, 2012

(30) Foreign Application Priority Data
Aug. 28, 2009 (EP) ..................................... 09425335

(51) Int. Cl.
A43B 7/12 (2006.01)
A43B 7/06 (2006.01)
B29D 35/14 (2010.01)

(52) U.S. Cl.
CPC .................. *A43B 7/125* (2013.01); *A43B 7/06* (2013.01); *B29D 35/142* (2013.01)

(58) Field of Classification Search
CPC ................................ A43B 7/06; A43B 7/125
USPC .............................................. 36/12, 14, 3 B
See application file for complete search history.

(56) References Cited

U.S. PATENT DOCUMENTS

2004/0035022 A1   2/2004  Polegato Moretti
2009/0172971 A1*  7/2009  Peikert et al. .................... 36/88
(Continued)

FOREIGN PATENT DOCUMENTS

CN    101232826 A    7/2008
JP    10-234414 A    9/1998
(Continued)

OTHER PUBLICATIONS

Combined Office Action and Search Report issued Apr. 24, 2015 in Taiwanese Patent Application No. 099128964 (with English language translation).

(Continued)

*Primary Examiner* — Ted Kavanaugh
(74) *Attorney, Agent, or Firm* — Oblon, McClelland, Maier & Neustadt, L.L.P.

(57) ABSTRACT

A vapor-permeable shoe including an upper assembly that wraps around the foot insertion region and is associated, in its plantar region, with a sole that includes at least one vapor-permeable or perforated portion. The upper assembly includes a structural insert that includes at least one waterproof portion sealed impermeably to the sole, covering its vapor-permeable or perforated portion. The waterproof portion includes at least partly a waterproof and vapor-permeable functional element that is impermeable to water in the liquid state and is permeable to water vapor, at least one functional portion of the functional element having such a thickness as to give it a penetration resistance that is greater than approximately 10 N, assessed according to the method presented in chapter 5.8.2 of the ISO 20344-2004 standard.

30 Claims, 7 Drawing Sheets

(56) References Cited

U.S. PATENT DOCUMENTS

| | | |
|---|---|---|
| 2009/0188134 A1 | 7/2009 | Polegato Moretti |
| 2009/0277047 A1 | 11/2009 | Polegato Moretti |
| 2011/0252667 A1 | 10/2011 | Polegato Moretti |
| 2012/0055042 A1 | 3/2012 | Polegato Moretti |

FOREIGN PATENT DOCUMENTS

| | | |
|---|---|---|
| JP | 2000-166606 A | 6/2000 |
| TW | 200812516 A | 3/2008 |
| TW | 200911156 A | 3/2009 |
| TW | 200913920 A | 4/2009 |
| WO | 2007 147421 | 12/2007 |
| WO | 2007 148365 | 12/2007 |
| WO | 2008 003375 | 1/2008 |

OTHER PUBLICATIONS

U.S. Appl. No. 13/611,536, filed Sep. 12, 2012, Polegato Moretti.
European Search Report Issued Mar. 1, 2010 in EP 09 42 5335 Filed Aug. 28, 2009.
International Search Report Issued Nov. 8, 2010 in PCT/EP10/61345 Filed Aug. 4, 2010.
Japanese Office Action issued Aug. 5, 2014 in Patent Application 2012-525969 with English Translation.

* cited by examiner

VAPOR-PERMEABLE SHOE

TECHNICAL FIELD

The present invention relates to a vapor-permeable shoe.

BACKGROUND ART

As is known, the portion of the foot that has the greatest perspiration effect is the sole.

Therefore, the region of the shoe where moisture produced by perspiration can accumulate most is the interface between the sole of the foot and the sole of the shoe.

Here, the sweat that is produced saturates the air with moisture and mostly condenses, stagnating on the footbed.

Only a marginal fraction of the moisture produced by perspiration diffuses to the sides of the upper and exits from them if they are vapor-permeable.

This effect of stagnation of perspiration in the plantar region is particularly conspicuous in shoes that have a rubber sole; in such cases vapor permeation through the sole is in fact prevented by its total waterproofness.

As is known, the stagnation of sweat in the plantar region produces in the user of the shoe a feeling of discomfort and constitutes a preferential location for the growth of bacterial cultures, which notoriously cause bad odors.

The need to obviate the stagnation of moisture produced by perspiration at the plantar region of shoes is therefore a commonly felt need.

A first attempt to meet this need consists of the solution proposed in Italian patent no. 1232798.

The teaching contained in said patent consists in dividing the rubber sole into two layers, the lower of which has through micro-holes, and in interposing between them a semipermeable membrane that is joined perimetrically to the two layers, in order to avoid infiltrations of water and thus obtain a sole that is impermeable to water in the liquid state and is permeable to water vapor.

For the sake of simplicity, hereinafter an element with the property of being impermeable to water in the liquid state and permeable to water vapor is indicated as waterproof and vapor-permeable.

The semipermeable membranes that the inventor of Italian patent no. 1232798 teaches to use are for example of the type described in U.S. Pat. Nos. 4,187,390 and 4,194,041 in the name of W. L. Gore or U.S. Pat. No. 6,228,477 in the name of BHA Technologies.

These membranes are provided by means of thin films of expanded polytetrafluoroethylene, e-PTFE, with thicknesses that generally vary from 15 to 70 microns, and are waterproof and vapor-permeable.

Their microstructure is characterized by the presence of dense areas, known as nodes, which are interconnected by elongated filaments, known as fibrils.

These semipermeable membranes, initially conceived for the military sector, have been developed and used in the field of clothing and shoes to avoid the accumulation of water vapor caused by perspiration in items of clothing and provide shoes with uppers with waterproof and vapor-permeable linings.

Since the market of the clothing and shoes sectors has always required soft and comfortable items, in the described applications there is a strong need to make sure that the membrane, understood as a functional layer, does not compromise these characteristics.

This requirement has developed into an actual technical prejudice, which has entailed the use of membranes provided in low thicknesses in order to be laminated with support and/or aesthetic finishing materials, such as fabric or leather, so as to obtain finished laminates that have enhanced characteristics of flexibility, ease of bending, softness, surface slipperiness, compressibility and extensibility and low weight per unit surface.

However, the films that provide these membranes have poor characteristics of mechanical strength, indeed due to their low thickness.

Indeed, it should be noted that the value of resistance of the laminate derives mainly from the characteristics of the layer of fabric or of the support with which the membrane is coupled.

In particular, available films of polymeric material, used to provide said membranes as mentioned, have thicknesses generally from 15 to 70 microns, which give them limited penetration resistance, i.e., less than 5 N.

The expression "penetration resistance" is used to reference the characteristic defined by a measurement performed according to the method presented in the ISO 20344-2004 standard in chapter 5.8.2, "Determination of the penetration resistance of the sole" related to safety shoes.

This limited mechanical resistance to penetration has led the inventor of the Italian patent no. 1232798 to prevent contact of the membrane with foreign objects by limiting the diameter of the holes of the sole which the membrane faces.

However, this solution has proved to limit drastically the area of the sole assigned to vapor permeation; moreover, the holes can become blocked.

The teaching contained in European patent no. 858,270 by the same Applicant proposes a solution that is aimed at overcoming these drawbacks but is still not entirely free from aspects that can be improved.

This patent illustrates a shoe with a sole made of elastomer which is perforated and comprises a midsole that comprises a waterproof and vapor-permeable membrane superimposed on a lower protective layer, preferably made of felt, which is treated so as to be water-repellent.

Since the protective layer is not made of waterproof material, it is not possible to perform a direct seal of the midsole with the sole, but a perimetric waterproof element is used which provides a sealing bridge between the waterproof and vapor-permeable membrane and the sole.

As mentioned, this invention, while allowing effective protection of the membrane against the penetration of external objects, has some aspects that can be improved.

In particular, the connection of the protective layer to the membrane, in order to allow an effective protection thereof, must occur by way of their intimate adhesion.

For this purpose, adhesives and glues are used which, while not covering all of the surface of the membrane, limit the vapor-permeable portion of the part that they affect.

Moreover, the protective layer itself, despite being vapor-permeable, is an obstacle to the passage of water vapor from the inside to the outside of the shoe through the midsole.

This drawback increases when, during use of the shoe, the protective is layer progressively loses its characteristics of water-repellence and therefore tends to become impregnated with water and/or mud or other types of dirt, absorbed through the holes of the tread, compromising the vapor permeability of the sole.

Another drawback consists in that during use the cyclic flexing and traction to which the midsole is subjected during walking tends to cause progressive wear and tearing of the membrane, thus causing a loss of waterproofness to the sole.

In order to obviate this drawback, European patent no. 858,270 teaches to provide soles that have small holes that are sufficiently spaced to not compromise their structural strength.

In this manner, the sole supports the midsole so as to contrast the tearing of the membrane.

However, the portion of sole that can be crossed by water vapor is limited indeed by the rarity and narrowness of the holes with which it is provided.

Finally, the presence of multiple layers inside the sole limits its ability to flex, making it rigid, to the full disadvantage of user comfort.

A further solution, aimed at proposing a compromise between the need to contrast the tearing of the membrane and the need to allow effective disposal of water vapor produced by perspiration through the sole, is disclosed in Italian patent no. 1.334.928 by the same Applicant.

This patent discloses a sole that has a structure that comprises a supporting layer which, at least in one macroportion, is made of mesh, felt or other diffusely perforated material.

A membrane made of material that is waterproof and permeable to water vapor is associated in an upward region with the supporting layer so as to cover at least the macroportion thereof.

Moreover, a sole made of polymeric material, with at least one macrohole that passes through at the macroportion, is joined so as to form a seal to the membrane and to the supporting layer at the perimeter of the macroportion.

This patent contains the teaching of structuring the membrane by enhancing it with tear-resistant layers, made for example of nylon mesh intimately associated with the waterproof and vapor-permeable membrane, protective layers and also high-strength layers made for example of Kevlar fabric.

The presence of the macrohole allows to define a large surface of the membrane that is adapted for heat exchange and for the exchange of water vapor with the outside of the shoe; simultaneously, the loss of structural stiffness of the sole is compensated, to contrast the tearing of the waterproof and vapor-permeable membrane, by the supporting layer.

The advantage provided by having a large portion of sole free for vapor permeation is reduced, however, by the obstacle to the passage of water vapor that is constituted by the presence of the several layers that compose the supporting layer.

A further solution, aimed at obtaining an effective disposal of water vapor produced by perspiration through the sole, is disclosed in European patent EP 1185183 by the same Applicant.

This patent discloses the method for manufacturing a vapor-permeable sole that consists of a first step in which a unitary upper assembly is formed which comprises a membrane made of waterproof and vapor-permeable material and a protective element made of a material that is resistant to hydrolysis, water-repellent, breathable or perforated.

The upper is fixed directly to the membrane in a lower region.

A second step consists in mutually fixing the upper assembly thus obtained and a sole made of perforated elastomer by means of a joint with a perimetric seal.

The protective element is arranged below the membrane, in a region comprised between the upper part of the sole and its inner part, which is adjacent to the ground contact surface.

The text of the patent contains the teaching of directly associating by gluing the insole or the upper with a waterproof and vapor-permeable membrane, which is integrated with supporting layers, made for example of mesh of synthetic material, and with protective layers, made for example of non-woven fabric or needle fabric or Kevlar fabric.

The advantage offered by providing the membrane on the upper assembly, however, is reduced by the obstacle to the passage of water vapor that is constituted by the presence of the several layers that compose the insole or upper, the supporting layer and the protective layer and all the layers of adhesive interposed between.

Currently known vapor-permeable shoes, and particularly those with a vapor-permeable sole, therefore suffer several drawbacks, and in particular are
  complicated, due to the presence of many superimposed layers,
  rigid, since the materials that constitute the several layers limit the flexibility of the polymeric material of the sole,
  generally perceived as not being comfortable, when the inevitable hollows caused by the different stratification of the underlying elements are felt through the insole,
  scarcely vapor-permeable, due to the overlap of multiple layers, and to the presence of the adhesive needed to join them.

DISCLOSURE OF THE INVENTION

The aim of the present invention is to provide a vapor-permeable shoe that obviates these drawbacks by providing a sole that is resistant at least as much as currently known soles and is at least as effectively waterproof, allowing however greater vapor permeability.

Within this aim, an object of the invention is to propose a vapor-permeable shoe that is lighter and more flexible than currently known vapor-permeable shoes and is at least equally resistant.

Another object of the invention is to provide a vapor-permeable shoe whose sole is more comfortable with respect to currently known vapor-permeable shoes and is at least equally resistant, particularly to penetration and tearing.

Another object of the invention is to propose a vapor-permeable shoe that is structurally simple and easy to manufacture and can be produced with relatively low costs.

This aim, as well as these and other objects that will become better apparent hereinafter, are achieved by a vapor-permeable shoe comprising an upper assembly that wraps around the foot insertion region and is associated, in its plantar region, with a sole that has at least one vapor-permeable or perforated portion, characterized in that
  said upper assembly comprises a structural insert that has at least one waterproof portion that is sealed impermeably to said sole, covering said at least one vapor-permeable or perforated portion thereof, so as to prevent the infiltration of liquid, through it, toward the foot insertion region,
  said waterproof portion being composed at least partly of a waterproof and vapor-permeable functional element that has a monolithic sheet-like structure made of a polymeric material that is impermeable to water in the liquid state and is permeable to water vapor, at least one functional portion of said functional element having such a thickness as to give it a penetration resistance that is greater than approximately 10 N, assessed according to the method presented in chapter 5.8.2 of the ISO 20344-2004 standard.

BRIEF DESCRIPTION OF THE DRAWINGS

Further characteristics and advantages of the invention will become better apparent from the description of preferred but not exclusive embodiments of the shoe according to the invention, illustrated by way of non-limiting example in the accompanying drawings, wherein.

Figure 1:
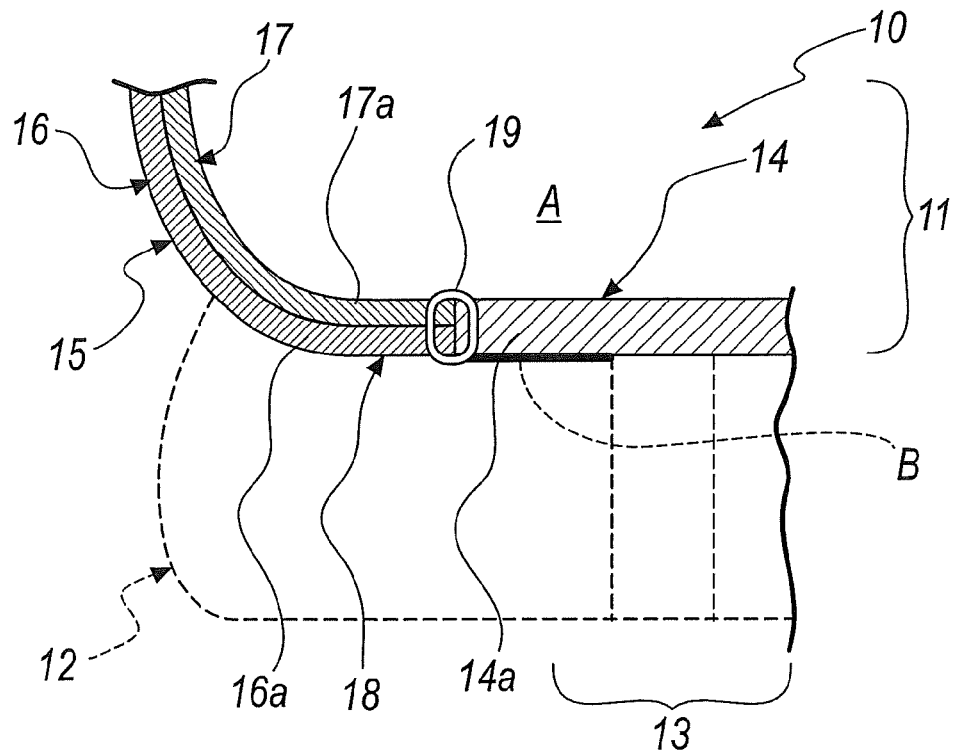
FIGS. 1, 2, 3, 4 and 5 are respectively schematic sectional views of corresponding details of variations of the upper assembly of a vapor-permeable shoe provided according to the invention, in a first embodiment.

It is noted that anything found to be already known during the patenting process is understood not to be claimed and to be the subject of a disclaimer.

Ways of Carrying Out the Invention

With reference to the figures, the reference numeral 10 generally designates a vapor-permeable shoe that comprises an upper assembly 11 that wraps around the foot insertion region A and is associated, in its plantar region, with a sole 12 that has at least one vapor permeable or perforated portion 13.

According to the invention, the vapor-permeable shoe 10 has a particularity in that the upper assembly 11 comprises a structural insert 14 that has at least one waterproof portion that is sealed impermeably to the sole 12, so as to cover its vapor-permeable or perforated portion 13, so as to prevent the infiltration of liquid through it toward the foot insertion region A, said waterproof portion being composed at least partly of a waterproof and vapor-permeable functional element that has a monolithic sheet like structure and is made of a polymeric material that is impermeable to water in the liquid state and is permeable to water vapor, at least one functional portion of said functional element having such a thickness as to give it a penetration resistance of more than approximately 10 N, assessed according to the method presented in chapter 5.8.2 of the ISO 20344-2004 standard.

The term "sheet-like" is used to reference the shape characteristic of a structure that has one dimension that is greatly reduced with respect to the other two, said dimension being its thickness, which in any case, according to what is commonly understood so as to distinguish a sheet from a foil or a membrane, remains substantial.

However, one should not understand that this shape characteristic in itself compromises the ability of the insert to bend or flex.

In particular, conveniently said thickness is comprised substantially between 0.5 and 2 mm and is preferably uniform.

Advantageously, said monolithic sheet-like structure is stratified and cohesive, comprising a plurality of functional layers made of polymeric material which are impermeable to water in the liquid state and are permeable to water vapor.

Moreover, the functional element conveniently comprises at least one auxiliary layer that is permeable to water vapor and is between said functional layers.

In particular, the auxiliary layers conveniently are made of a material that is structured in fibers according to a fabric-like or non-woven fabric-like configuration.

Preferably, said polymeric material is selected among expanded polytetrafluoroethylene, e-PTFE, polyurethane, PU, polyethylene, PE, polypropylene, PP, polyester and the like.

The structural insert 14 is conveniently structured like an assembly insole for a top assembly 15, the upper assembly 11 being formed by the top assembly 15 and by the structural insert 14 with which the latter is associated in a downward region so as to close it.

Preferably, the structural insert 14, structured like an assembly insole, is entirely composed of said functional element, and therefore said waterproof portion coincides with the totality of the structural insert 14.

In alternative constructive solutions of said structural insert, structured like an assembly insole, it comprises at least one of said waterproof portions at least partly made of said functional element and at least one second portion thereof made of a material selected among leather, cellulose material, such as Texon, felt and the like, and is further optionally reinforced at the plantar arch and at the heel by a shank made of a material selected among leather, felt and metallic material.

Among these alternative constructive solutions, if said structural insert is used for example as an insole of the Strobel type, the functional element conveniently constitutes the portion that is located at the forefoot and is joined, by means of a zigzag seam, to the remaining portion made of felt.

Thanks to its characteristic of tear strength, the functional element is capable of allowing an adequate tightness of the seams on its perimetric edge.

Figure 12:
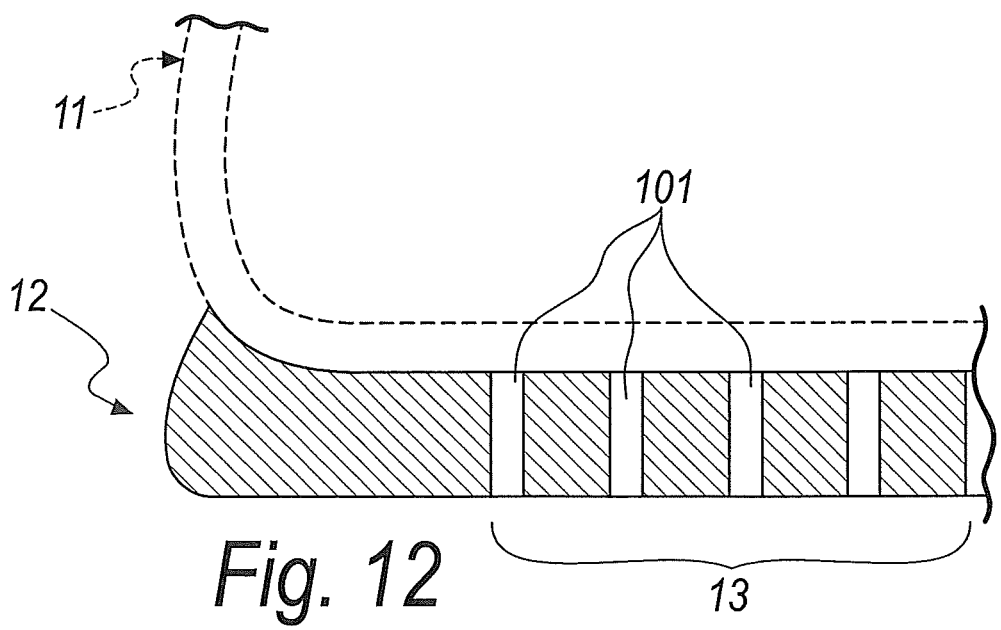
FIGS. 12, 13 and 14 are respectively schematic sectional views of corresponding details of embodiments of a sole of vapor-permeable shoe according to the invention.
Figure 13:
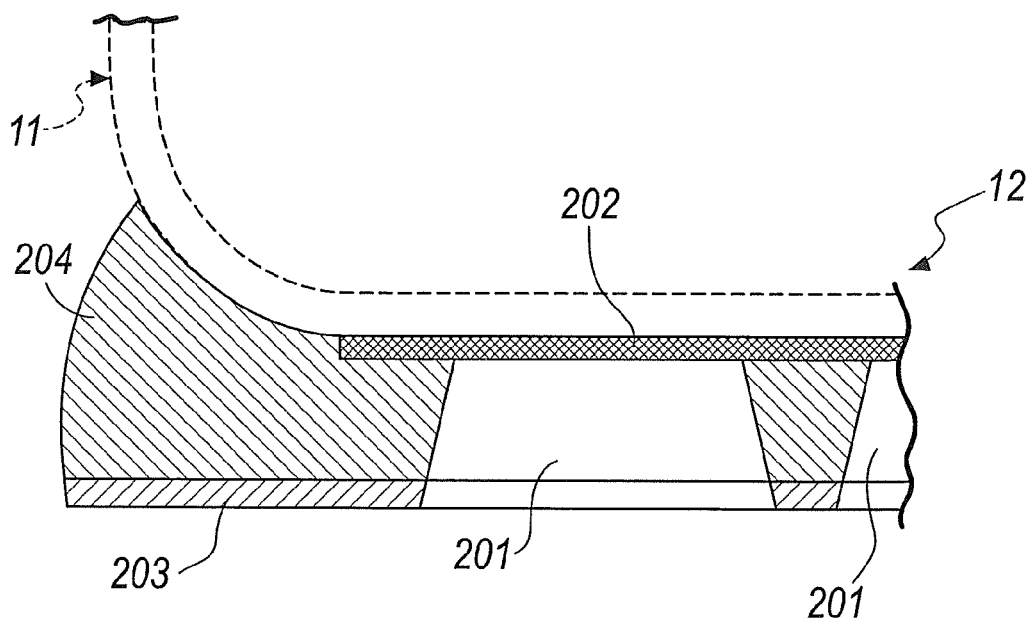
Figure 14:
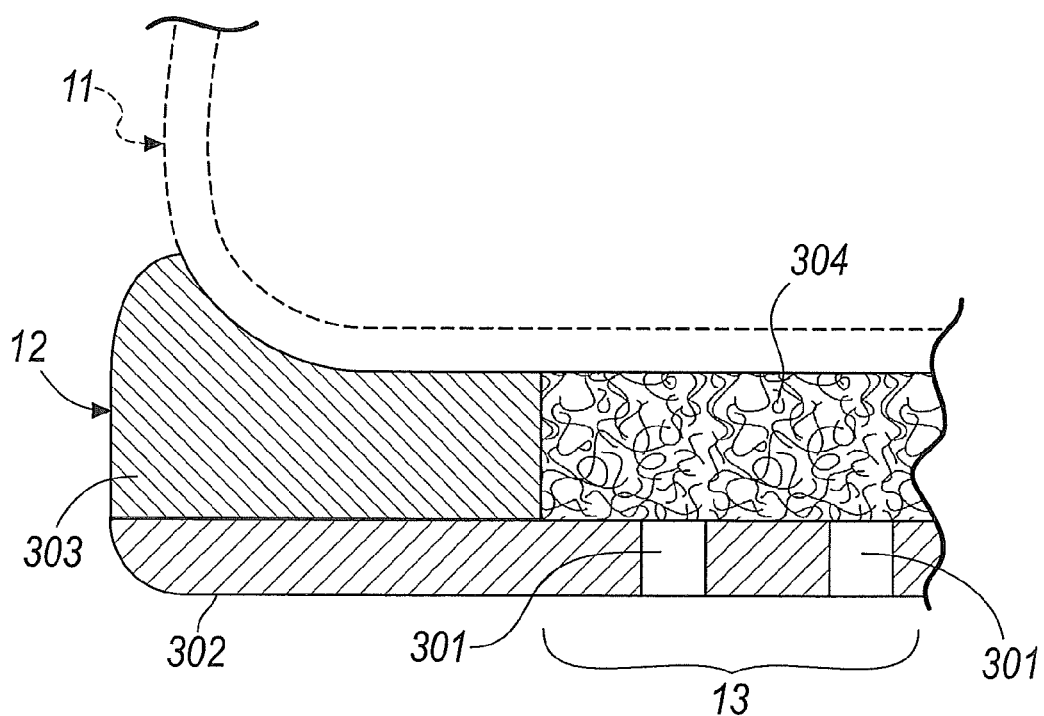

With particular reference to FIGS. 12, 13 and 14, they illustrate, by way of non-limiting example, alternative embodiments of a sole 12 of a vapor-permeable shoe 10 according to the invention.

In particular, with reference to FIG. 12, in a first one of said embodiments the sole 12 is a single body, made of polymeric material, for example rubber or the like.

The vapor-permeable or perforated portion 13 conveniently has at least one through opening, such as a plurality of holes 101 that pass through the sole 12.

In a second one of said embodiments, not shown in the accompanying figures, the sole 12 conveniently comprises a lower portion, made of polymeric material, which is provided with a tread, and an upper portion, made of polymeric material, for connection to the upper assembly 11.

According to a third one of said embodiments, shown for example in FIG. 13, the sole 12 advantageously has the vapor-permeable or perforated portion 13 that is formed by large through openings 201 and is conveniently provided with a supporting element 202 that is adapted to support the structural insert 14.

The supporting element 202, which covers the through openings 201, is preferably made of a material that is resistant to hydrolysis and is vapor-permeable or perforated, conveniently selected among a mesh of nylon fibers, a mesh of fibers of metallic material, felt and the like.

The structural insert 14 conveniently is superimposed on the supporting element 202 in order to be supported by it.

In this manner, during use of the vapor-permeable shoe 10, the supporting element 202 contrasts the sinking of the structural insert 14 in the through openings 201.

Conveniently, the sole 12 comprises a lower portion 203, made of polymeric material, which is provided with a tread, and an upper portion 204, made of polymeric material, for connection to the upper assembly 11.

The supporting element 202 can be glued or co-molded alternately on the lower portion 203 or on the upper portion 204 of the sole 12.

In a fourth one of said embodiments, shown for example in FIG. 14, the vapor-permeable or perforated portion 13 is defined by at least one through opening, conveniently a plurality of holes 301, the sole 12 comprising a lower portion 302 made of polymeric material, which is provided with a tread, and an upper portion 303, made of polymeric material, for connection to the upper assembly 11.

Moreover, the sole 12 advantageously comprises at least one vapor-permeable or diffusely perforated filler 304, which covers the functional element in order to shield it from molten polymeric material adapted to form the sole 12, or a portion thereof, during the overmolding thereof on the upper assembly 11.

The filler 304 is in fact useful to safeguard the vapor-permeable or perforated portion 13 against possible infiltrations of the polymeric material of the upper portion 303 during molding by direct injection.

In the case of direct injection of the sole 12 in a single body, the filler 304 is designed to prevent the injection of the polymeric material that constitutes the sole 12 from attacking the structural insert 14, with the consequence of damaging the functional element or of inhibiting almost completely its vapor permeability.

The use of the filler 304 allows to keep the functional element detached from the tread of the sole 12, so to keep it intact and free to allow the exit of the molecules of water vapor produced by perspiration on its entire surface and not only at the holes 301 of the sole 12.

In general, the use of said filler is particularly advantageous in soles of considerable thickness, since it allows to reduce the depth of the channels that provide said holes, passing through said lower portion and thus preventing said channels from being deep enough to retain therein external objects that enter them.

Moreover, containment of the depth of said channels allows limitation of the height of the pins that protrude from the mold for providing the sole and are adapted to define said holes, extraction of the molded sole from the mold being therefore easier.

Moreover, thanks to the use of said filler, a lighter sole is obtained, since said filler weighs less than the polymeric material of the sole that it replaces.

Said filler 304 is advantageously made of non-woven fabric or felt of a material that is resistant to hydrolysis and water-repellent, so as to safeguard the vapor permeability of the sole.

A material that is particularly adapted for providing the filler 304 is polyester felt such as the one known commercially as JET3000, manufactured by the company ORV Manufacturing S.p.A.

If the filler 304 is made of a material that is not vapor-permeable, such as microporous rubber or EVA, which are generally used for reasons of comfort and better resilience with respect to felt, and therefore the filler is perforated, then it is possible to provide, between the lower portion 302 and the filler 304, in any case a thin barrier element, advantageously made of vapor-permeable felt or mesh, which stops any mud or other types of dirt absorbed during use of the vapor-permeable shoe 10 according to the invention, avoiding their penetration and stagnation in the holes of the filler 304.

In general, the sole 12 is made of polymeric material, conveniently vulcanized rubber or thermoplastic material (TPU, TR), or polyurethane (PU).

The upper portion 204 or 303 is preferably made of ethyl vinyl acetate, EVA, or expanded polyurethane, PU.

The sole 12 conveniently is joined to the upper assembly 11 for example by gluing along a perimetric band and is sealed impermeably at least perimetrically to said waterproof portion of the structural insert 14. This makes the sole waterproof.

If the functional element constitutes only a portion of the structural insert 14, if the vapor-permeable or perforated portion 13 is limited only to corresponding delimited regions of the sole 12, then the seal of the sole 12 to the structural insert 14 is conveniently provided at least perimetrically to the functional element, at the vapor-permeable or perforated portion 13, the remaining portions of the structural insert 14 corresponding to waterproof and non-vapor-permeable portions of the sole 12.

As an alternative, it is possible to provide for the direct injection of the sole 12 or of at least of its upper portion 204 or 303 onto the upper assembly 11.

Direct injection onto the upper is a construction method according to which the sole 12, or its upper portion 204 or 303, is formed directly on the upper assembly 11 in a single injection operation.

According to this method, an appropriately manufactured mold is closed by a generally metallic last onto which the upper assembly 11 is fitted.

Polymeric material, which is naturally fluid or rendered fluid by heating, is injected into the mold in order to form the sole 12 directly on the structural insert 14 of the upper assembly 11.

This almost liquid polymeric material in fact grips easily the upper assembly 11 and particularly the structural insert 14.

Thus, the polymeric material firmly anchors itself to the top assembly 15 and to the structural insert 14, at least perimetrically with respect to the functional element, sealing thereto the sole that it forms.

In assembling, according to this method, a sole 12 in the third embodiment, the supporting element 202 is conveniently glued at least perimetrically on the structural insert 14 prior to the injection of the polymeric material that constitutes the upper portion 204 of the sole 12, or is advantageously inserted within the mold so that its coupling to the upper assembly 11 occurs without the use of adhesives, but only by means of the polymeric material that composes the upper portion 204 of the sole 12.

Conveniently, the edge of the vapor-permeable or perforated portion 13 is internal to the edge of the functional element of the structural insert 14, in order to allow the waterproof sealing of the functional element 14 to the sole 12 and the gluing of the top assembly 15 to the sole 12.

An inner vapor-permeable footbed, which is optionally removable, completes the shoe.

It should be noted that in general the sole 12 can comprise, in a similar and substantially equivalent manner, depending on the contingent needs, more than one of said upper portions and of said lower portions.

Figure 2:
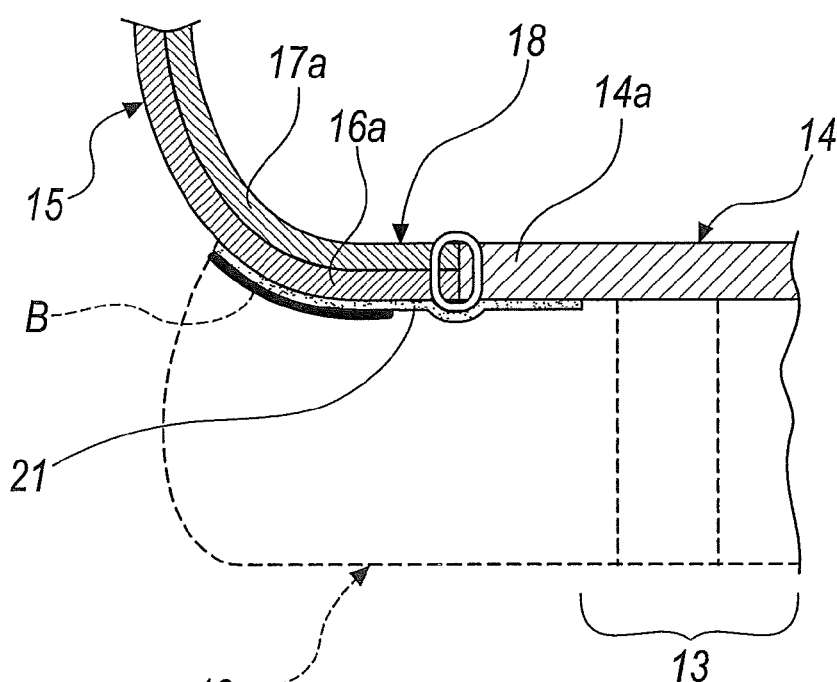

With particular reference to FIGS. 1 and 2, the top assembly 15 advantageously comprises at least one upper 16 and an upper lining 17, the lower flap 17a thereof being joined to the lower edge 16a of the upper 16 so is as to form a lower margin 18 of the top assembly 15 which is associated, by means of a seam 19, preferably of the Strobel type, perimetrically with respect to the perimetric edge 14a of the structural insert 14, which is structured like an assembly insole.

Thanks to the tear strength of the functional element, the structural insert can allow adequate tightness of the seams on its perimetric edge.

In this manner, the structural insert 14 is joined by means of the seam 19 to the lower margin 18, for example by means of the construction commonly known as Strobel, so as to form, during assembly of the vapor-permeable shoe 10, a sock-like bag into which one then inserts the last for the assembly of the sole 12 or the molding last for direct injection of the sole 12 on the upper assembly 11.

The lining 17 is conveniently associated with the upper 16 by spot gluing or by means of seams so as to not compromise its vapor permeability.

Preferably, for example, at the tip of the vapor-permeable shoe 10, an insert, not show in the accompanying figures, is associated with the upper 16, conveniently proximate to the lower edge 16a thereof, and is folded and glued, according to the construction known as "AGO lasting", so as to cover the region of connection of the lower edge 16a to the perimetric edge 14a of the structural insert 14.

A sealing film 21 made of thermoplastic adhesive material advantageously covers the region of connection of the lower margin 18 to the structural insert 14.

Said sealing film 21 defines a seal of the sole 12 to said waterproof portion of the structural insert 14, which covers at least the vapor-permeable or perforated portion 13 thereof, in order to prevent the infiltration of liquid through it toward the foot insertion region A.

In particular, the sealing film 21 extends the waterproof sealing area, of the sole 12 to said functional element, on the lower edge 16a of the upper 16.

The sealing film 21 conveniently is a thermoplastic hot-melt adhesive made for example of polyurethane, polyester, polyamide or polyolefins and can be activated by means of heat and pressure.

Said sealing film 21, during the assembly of the vapor-permeable shoe 10, exposed to the heat and subjected to pressing, softens and anchors itself to the materials between which it is interposed, adhering to them and gluing them.

By cooling, it then establishes a bonding of a mechanical and chemical type with the substrates of said materials, restoring its structural strength.

A material that is particularly adapted for providing the sealing film 21 is marketed by the company Bemis Associates Inc. with product code 3218 or by the company Collano AG, XIRO Adhesive Films, with product code XAF 36.004 (Puro).

In this manner, the waterproof area that is useful for sealing is extended from the perimeter of the functional element of the structural insert 14 to the lower edge 16a of the upper 16.

Therefore, the use of the sealing film 21 allows to make the sealing area coincide with the gluing area of the sole 12 to the upper assembly 11, cooperating to their adhesive bonding.

An advantage of the use of the sealing film 21 consists in that it protects the stratified structure of the functional element in the region of the waterproof seal, contrasting the risk of delamination, in particular in the presence of auxiliary layers between the functional layers.

As an alternative, the extension of the sealing area of the sole 12 on the lower edge 16a of the upper 16 is conveniently provided by applying layers of glue, advantageously polyurethane glue, as a replacement, in a substantially equivalent manner, of the sealing film 21.

Figure 3:
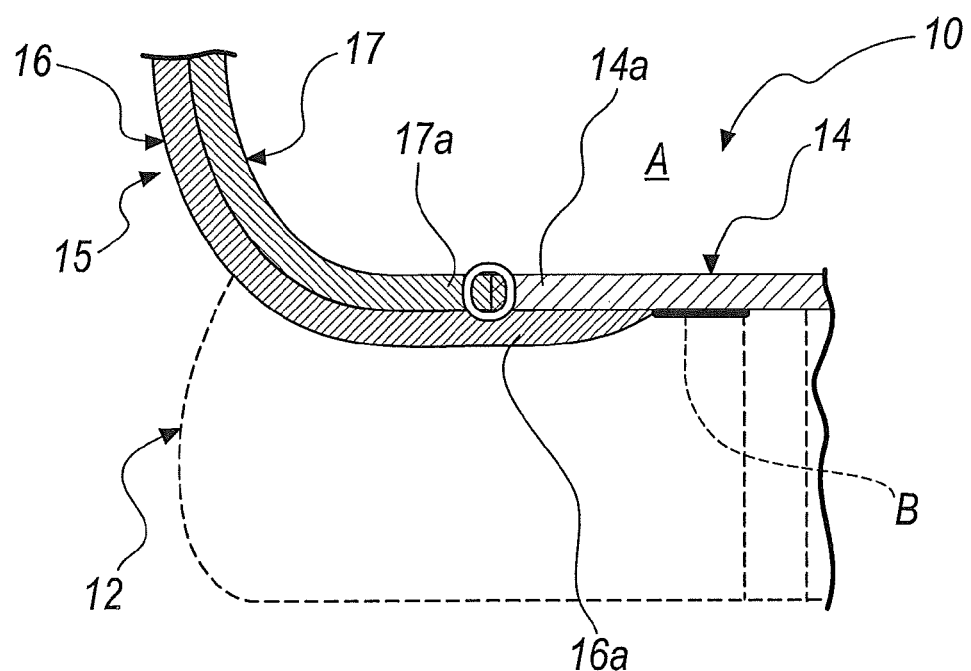

With particular reference to FIG. 3, in a first alternative embodiment of a vapor-permeable shoe 10, according to the invention, the top assembly 15 advantageously at least comprises
- the upper lining 17, the lower flap 17a of which is associated, by means of a seam 19, conveniently of the Strobel type, perimetrically with respect to the structural insert 14, which is structured like an assembly insole, and
- an upper 16, the lower edge 16a of which is folded and glued, according to the construction known as "AGO lasting", below the perimetric edge 14a of the structural insert 14, so as to cover its region for connection to the lower flap 17a, interposing itself partially between the perimetric edge 14a and the sole 12.

Figure 4:
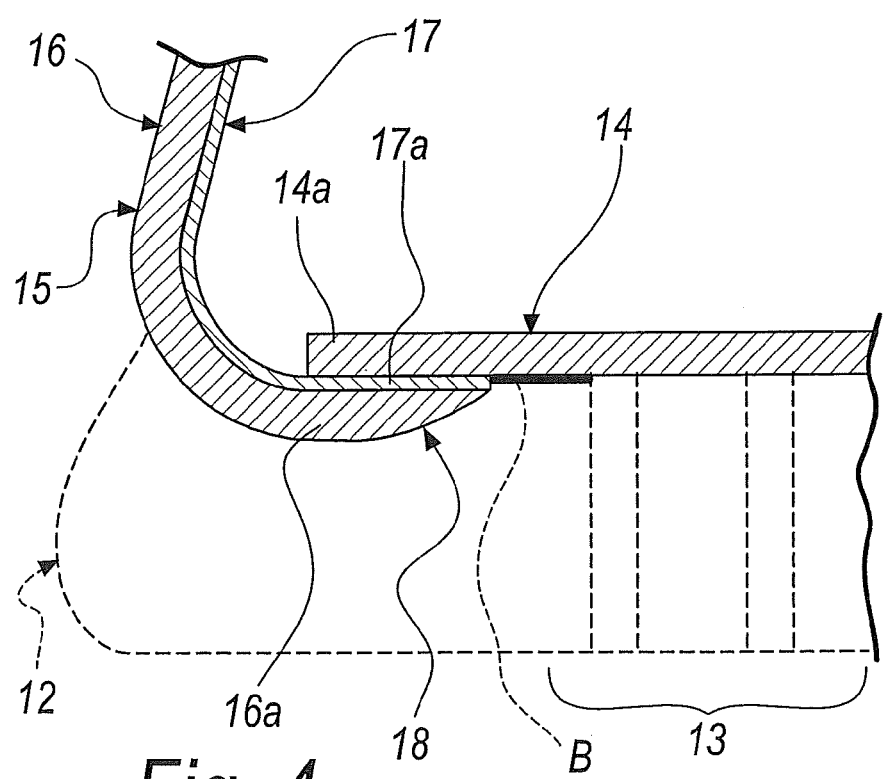
Figure 5:
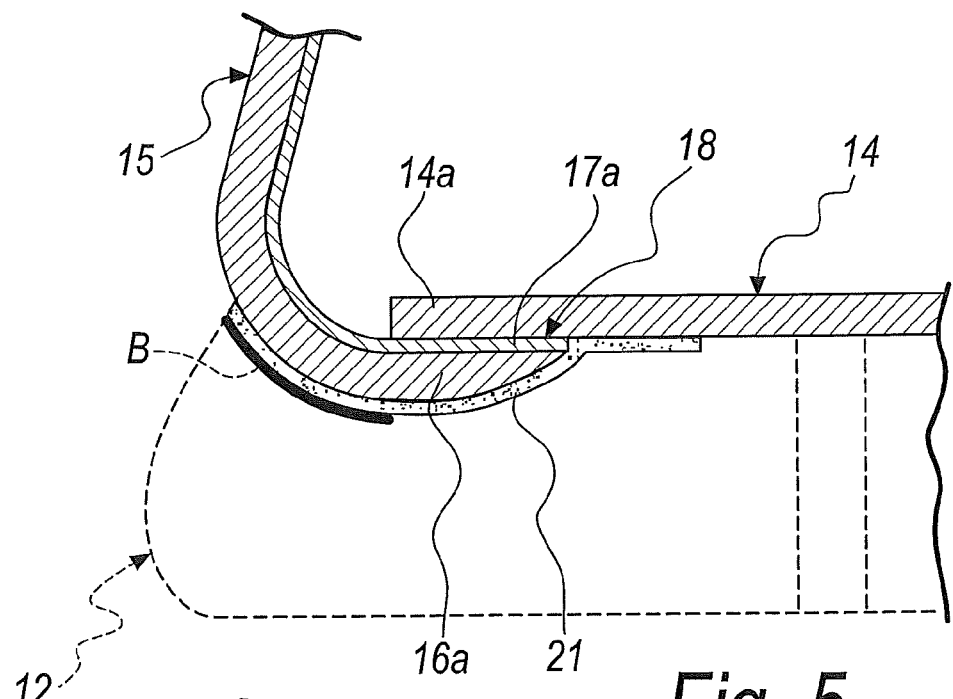

With particular reference to FIGS. 4 and 5, in a second alternative embodiment of the vapor-permeable shoe 10 according to the invention, advantageously the top assembly 15 at least comprises an upper 16 and an upper lining 17, the lower flap 17a of which is joined to the lower edge 16a of the upper 16 so as to form a lower margin 18 of the top assembly 15 which is folded and glued, according to the construction known as "AGO lasting", below the perimetric edge 14a of the structural insert 14.

Conveniently, a sealing film 21, made of thermoplastic adhesive material, covers the lower margin 18 and the structural insert 14 appropriately so as to form a band that is approximately 5 mm wide and is perimetric with respect to the functional element of the structural insert 14.

The sealing film 21 defines a seal of the sole 12 to the waterproof portion of the structural insert 14 that covers at least the vapor-permeable or perforated portion 13 thereof, so as to prevent the infiltration of liquid, through it, toward the foot insertion region A.

Said sealing film 21 is conveniently made of polyurethane, polyester, polyamide or polyolefins and is activated by means of heat and pressure.

Said film, during the assembly of the vapor-permeable shoe 10, exposed to heat and subjected to pressing, softens and grips the materials between which it is interposed, adhering to them and bonding them.

By cooling, it establishes an adhesive bonding of the mechanical and chemical type with these materials and restores its structural strength.

A material that is particularly adapted for providing the sealing film 21 is marketed by the company Bemis Associates Inc. with product code 3218 or by the company Collano AG, XIRO Adhesive Films with product code XAF 36.004 (Puro).

In this manner, the useful waterproof area for the seal is extended from the perimeter of the functional element of the structural insert 14, left free by the lower margin 18, to the lower edge 16a of the upper 16.

Therefore, the use of the sealing film 21 allows to make the sealing area coincide with the area of adhesive bonding of the sole 12 to the upper assembly 11, cooperating to their adhesive bonding.

Five further alternative embodiments are described hereinafter in which advantageously the top assembly 15 at least comprises
- a vapor-permeable upper 16,
- a vapor-permeable upper lining 17, arranged so as to line the upper 16 internally to the foot insertion region A,
- a waterproof and vapor-permeable upper membrane 22, which is between the upper 16 and the upper lining 17 so as to make the top assembly 15 waterproof and vapor-permeable.

The upper membrane 22 is sealed to the structural insert 14 for the waterproofness of the upper assembly 11.

The upper membrane 22 is conveniently of the type of commercially available ones, for example made of a material such as expanded polytetrafluoroethylene, e-PTFE, polyurethane, PU, or the like, and optionally a reinforcement mesh is associated thereto.

Moreover, in general, the upper membrane 22 can be coupled alternately to the lining 17 or to the upper 16, according to the requirements.

In a third alternative embodiment, the upper 16 is advantageously provided, at its lower edge 16a, with a waterproof heat-activatable sealing element 23, which adheres intimately so as to form a seal to the lower edge 22a of the upper membrane 22.

In this manner, upon assembling of the vapor-permeable shoe 10, if the sole 12, or at least an upper portion 204 thereof, is already pre-formed, it is joined hermetically to the upper assembly 11, advantageously by using adhesives.

The sealing element 23 is made for example of thermoadhesive waterproof material such as a thermoplastic hot-melt adhesive tape, preferably 10-15 mm wide, which is capable of melting and sealing the upper membrane 22.

The upper assembly 11 is conveniently already sealed at the upper membrane 22 and at the functional element of the structural insert 14, advantageously by using adhesives and sealants such as for example silicone or polyurethane adhesives, films of thermoplastic hot-melt adhesive such as those manufactured by the company Bemis Associates Inc. or by the company Collano AG or sealants commonly known as "reactive hot melt" sealants, for example polyurethanes such as the one known by the trade name Ipatherm S 14/176 of H.B. Fuller, or the like.

These sealants are applied so as to straddle the sealing element 23 and on a perimetric area of the functional element of the structural insert 14 so as to seal thereto the upper membrane 22.

As an alternative, if the sole 12 is associated with the upper assembly 11 by direct injection, sealing of the upper membrane 22 to the functional element is obtained by way of the polymeric material that adheres to it, further adhering to the sealing element 23.

In general, the sole 12 is associated hermetically with the upper assembly 11 substantially only at the sealing element 23 and at an exposed perimetric portion of the structural insert 14, without covering the vapor-permeable or perforated portion 13.

Figure 6:
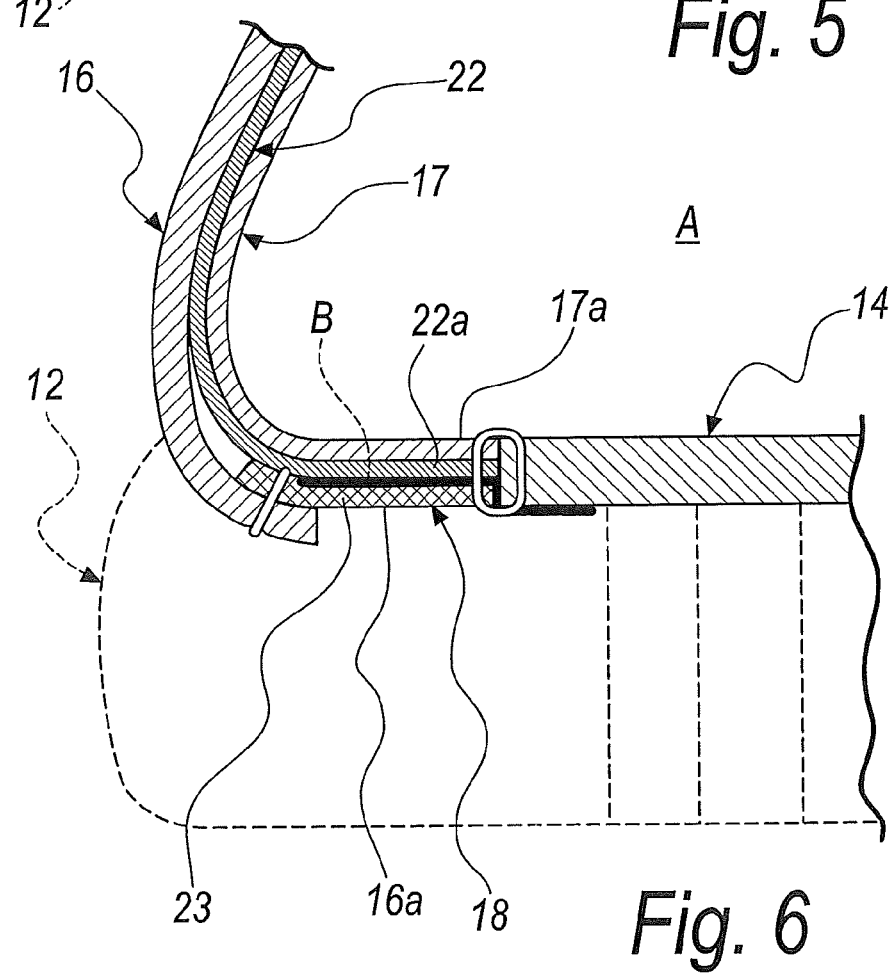
FIGS. 6, 7, 8, 9, 10 and 11 illustrate respectively, in schematic sectional views of corresponding details, variations of the upper assembly of a vapor-permeable shoe provided according to the invention, in a second embodiment.
Figure 7:
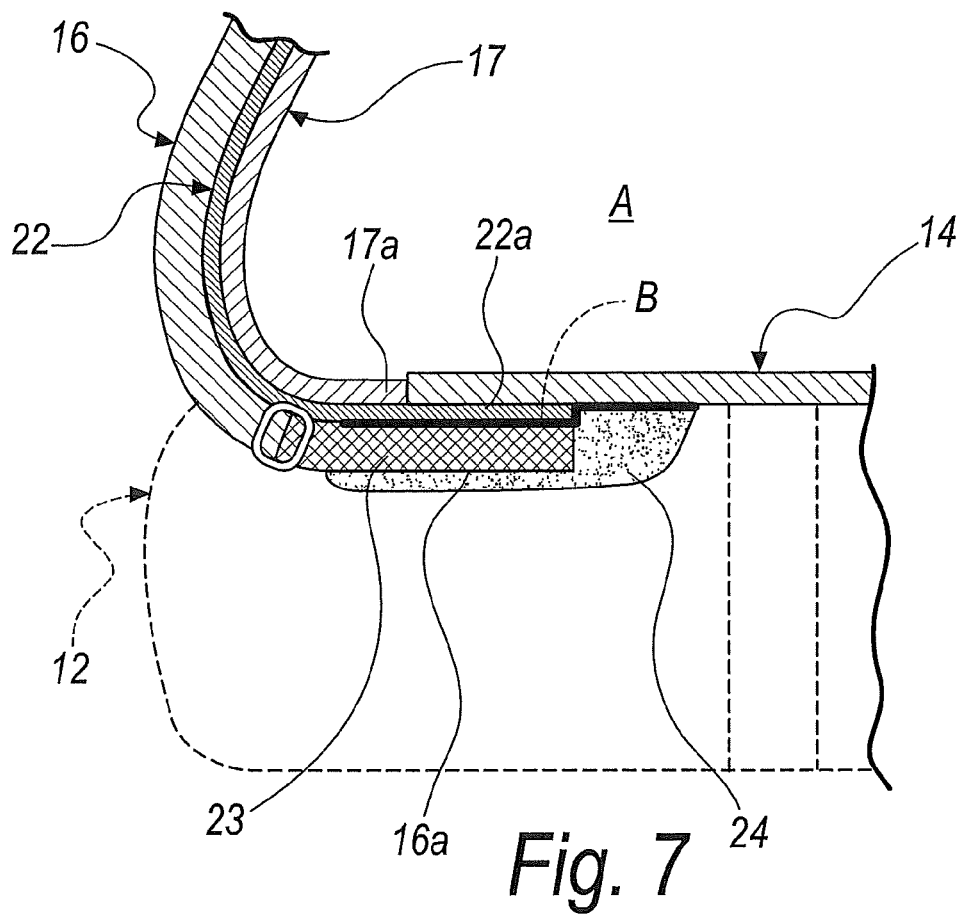

For example, with reference to FIG. 6, the exposed perimetric portion of the structural insert 14 coincides with the outer edge, while with reference to FIG. 7, the exposed perimetric portion of the structural insert 14 coincides with the edge left exposed by the lower margin 18.

In a fourth alternative embodiment, the upper 16 is provided, at its lower edge 16a, with a sealing element 23 that is permeable to sealing material and is permeated by sealing material that grips, so as to form a seal, the lower edge 22a of the upper membrane 22.

Advantageously, in this fourth alternative embodiment, the sealing element 23 is made of a mesh of synthetic material, knitted fabric, woven fabric, or three-dimensional fabric which is permeable to the polymeric material that constitutes the sole, in the case of direct injection, or, in the case of a sole glued to the upper assembly, to sealing materials, such as for example silicone adhesives or polyurethane adhesives.

Moreover, the sealing element 23 is preferably constituted by a monofilament material, so as to not wick water.

In this manner, upon assembling of the vapor-permeable shoe 10, if the sole 12, or at least an upper portion 204 thereof, is already pre-formed, it is joined hermetically to the upper assembly 11, advantageously by using adhesives.

In this case, the upper assembly 11 is conveniently already sealed at the upper membrane 22 and at the functional element of the structural insert 14, advantageously by using adhesives and sealants such as for example silicone or polyurethane adhesives, films of thermoplastic hot-melt adhesive, such as those manufactured by the company Bemis Associates Inc. or by the company Collano AG, XIRO Adhesive Films with product code XAF 36.004 (Puro) or sealants commonly known as "reactive hot melt", for example polyurethanes such as the one known by the trade name Ipatherm S 14/176 by H.B. Fuller, or the like.

Said sealants are applied to the sealing element 23, so as to permeate into it and grip the upper membrane 22, and on a perimetric area of the functional element of the structural insert 14, so as to seal therein the upper membrane 22.

As an alternative, if the sole 12 is associated with the upper assembly 11 by direct injection, one obtains sealing of the upper membrane 22 to the functional element by way of the polymeric material that adheres thereto permeating the sealing element 23.

In general, the sole 12 is associated hermetically with the upper assembly 11 substantially only at the sealing element 23 and at an exposed perimetric portion of the structural insert 14 without covering the vapor-permeable or perforated portion 13.

With particular reference to FIGS. 6 and 7, said third and fourth alternative embodiments can be provided for example according to three variations described hereinafter according to the contingent requirements.

In a first one of said three variations, the sealing element 23 is joined to the lower edge 22a and to the lower flap 17a of the upper lining 17 so as to form a lower margin 18 of the top assembly 15.

Said lower margin 18 is associated, by way of a seam 19, preferably of the Strobel type, perimetrically with the structural insert 14, which is appropriately structured as an assembly insole.

In a second one of said three variations, not shown in the accompanying figures, the lower edge 22a and the lower flap 17a of the upper lining 17 are joined quite coincident, and together are conveniently joined perimetrically to the structural insert 14, the sealing element 23 being folded and glued, according to the construction known as "AGO lasting", under the perimetric edge 14a of the structural insert 14 astride the joint between the lower edge 22a with the structural insert 14 in order to allow their sealing.

In a third one of said three variations, the sealing element 23 is joined quite coincident to the lower edge 22a, and are turned over and glued, according to the construction known as "AGO lasting", below the perimetric edge 14a of the structural insert 14.

It should be noted that, in particular, the lower edge 22a is glued hermetically to the structural insert 14.

Thus, the sealing element 23, conveniently made of a material that is lighter and thinner than the upper 16, allows to limit the formation of the creases that are produced due to the assembling operation of the tip and heel of the upper 16 on the structural insert 14.

Said creases, in currently known shoes, in fact constitute veritable channels for the infiltration of water.

Advantageously, in order to further strengthen the lasting margin 18, it is possible to apply directly to the lower edge 22a, for example after the association of the upper membrane 22 with the lower edge 16a, a waterproof reinforcement element, for example a waterproof thermo-adhesive tape, preferably an elastic one, made of synthetic material, not shown in the accompanying figures.

A tape that is particularly suitable for the provision of said waterproof reinforcement element is offered commercially by the company TecnoGI with a weight of 120-150 g/m$^2$.

Moreover, in order to prevent the wicking into the upper 16 of any water that, during use, might penetrate from the sole 12, the waterproof seal of the upper membrane 22 to the functional element of the structural insert 14 can be provided by means of adhesive material 24, which is applied to the lower edge 16a and to the structural insert 14 and grips the lower edge 22a of the upper membrane 22 through the sealing element 23.

Said adhesive material is preferably an adhesive and sealant of the type of silicone or polyurethane adhesives, films of thermoplastic hot-melt adhesive such as those manufactured by the company Bemis Associates Inc. or by the company Collano AG, or sealants commonly known as "reactive hot melt", for example polyurethanes such as the one known by the trade name Ipatherm S 14/176 by H.B. Fuller, or the like.

Figure 8:
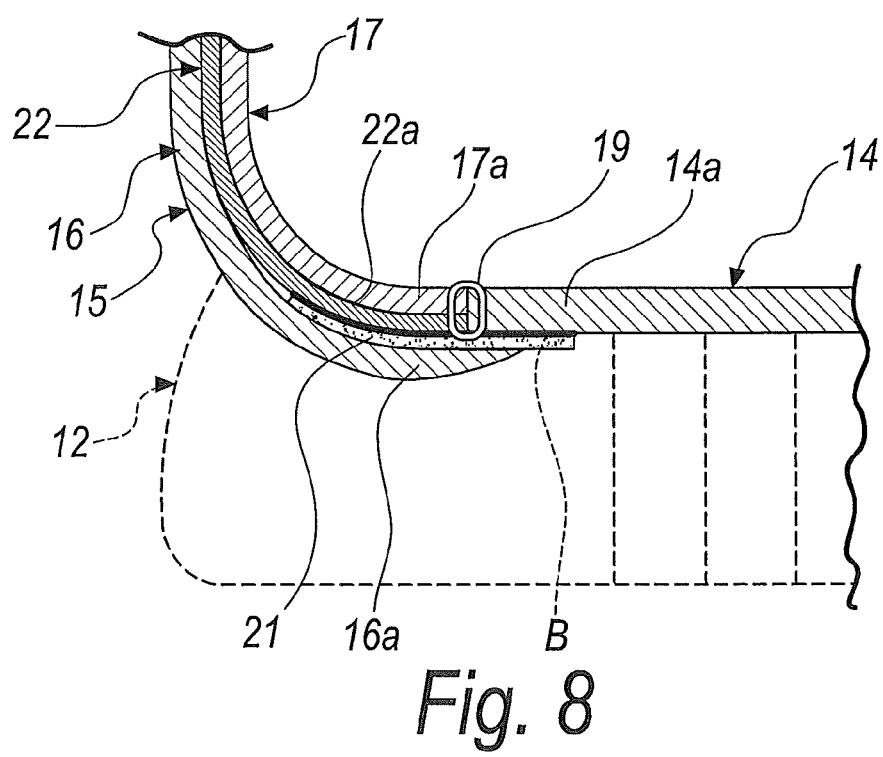

With particular reference to FIG. 8, in a fifth alternative embodiment the upper membrane 22 has the lower edge 22a joined to the lower flap 17a of the upper lining 17, the lower flap 17a and the lower edge 22a being joined quite coincident and associated, by means of a seam 19 preferably of the Strobel type, perimetrically with respect to the structural insert 14 structured like an assembly insole.

In said fifth alternative embodiment there is a sealing film 21 made of thermoplastic adhesive material which covers the region for connection of the lower edge 22a to the structural insert 14, so as to mutually seal them, conveniently sealing the seam 19 that joins them.

Moreover, the lower edge 16a of the upper 16 is folded and glued, according to the construction known as "AGO lasting", under the perimetric edge 14a of the structural insert 14, surmounting the sealing film 21.

Conveniently, the thermoplastic adhesive material that constitutes the sealing film 21 is selected among polyurethane, polyester, polyamide or polyolefins, and is activated by heat and pressure.

Said thermoplastic adhesive material, exposed to heat and subjected to pressing, softens and grips the materials between which it is placed and which must be sealed.

By cooling, it then establishes an adhesive bonding of a mechanical and chemical type with these materials and reacquires its original strength.

This type of sealing film 21 is marketed for example by the company Bemis Associates Inc. or by the company Collano AG.

Figure 9:
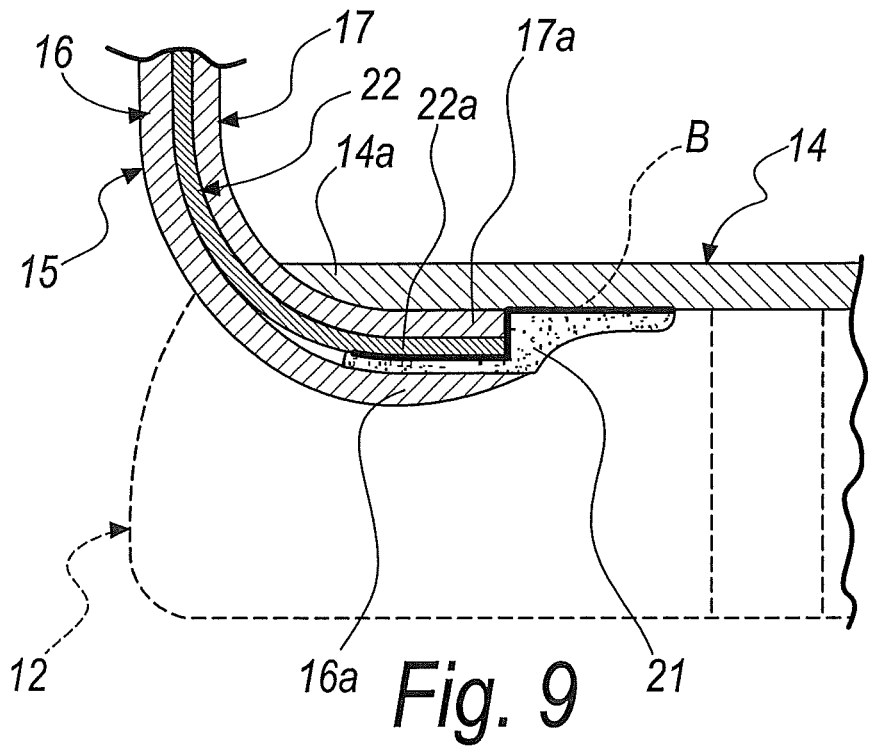
Figure 10:
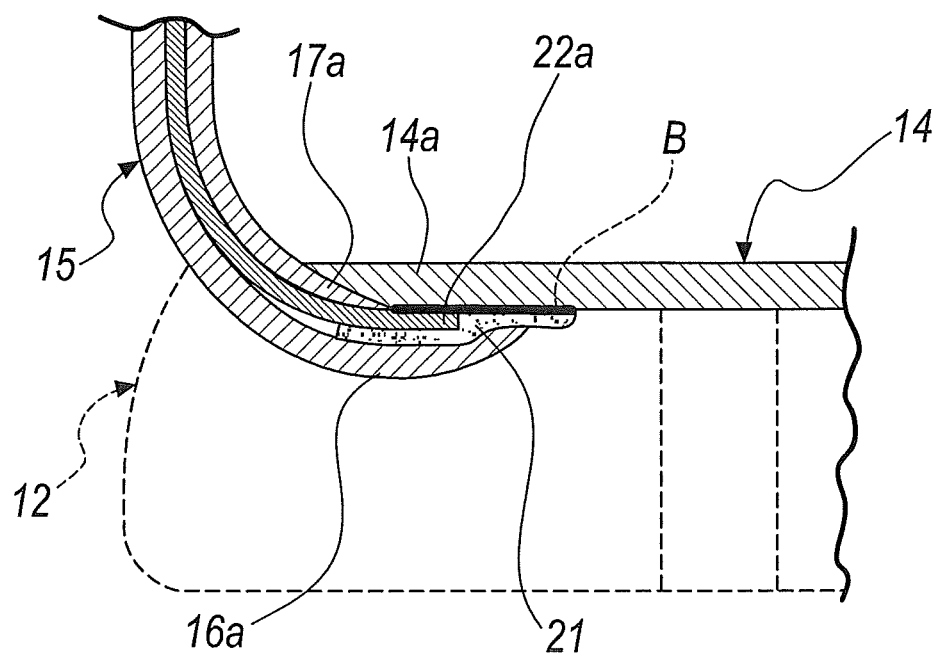

With particular reference to FIGS. 9 and 10, in a sixth alternative embodiment, advantageously the upper membrane 22 has the lower edge 22a joined to the lower flap 17a of the upper lining 17, said flap and the lower edge 22a being joined quite coincident and folded and glued, according to the construction known as "AGO lasting", under the perimetric edge 14a of the structural insert 14, which is structured as an assembly insole, without the use of tacks or staples that might damage the upper membrane 22.

The lasting of the lower edge 22a joined to the lower flap 17a under the perimetric edge 14a of the structural insert 14 is conveniently performed with a machine known as a lasting machine, whose lasting pincers have been advantageously flattened or lack clamping teeth or millings so as to not tear the upper membrane 22, or can be performed manually by means of appropriate tools, used to pull and stretch, under the perimetric edge 14a, the lower edge 22a joined to the lower flap 17a.

At the same time, there is conveniently a sealing film 21 made of thermoplastic adhesive material that covers the region for connecting the lower edge 22a to the structural insert 14 so as to mutually seal them.

Said adhesive material is preferably of the thermoplastic hot-melt type, such as the one manufactured by the company Bemis Associates Inc. or by the company Collano AG, or the like.

Moreover, conveniently the upper 16 has its lower edge 16a folded and glued, for example by means of thermoplastic adhesive, according to the construction known as "AGO lasting", under the perimetric edge 14a of the structural insert 14, surmounting the sealing film 21.

Moreover, advantageously, the lower flap 17a, joined to the lower edge 22a, is skived for approximately 10-15 mm, as shown for example in FIG. 10, so as to expose said edge, allowing a direct seal of the lower edge 22a with the perimetric edge 14a of the structural insert 14.

Said skiving operation consists in thinning the margin of the material of the lower flap 17a, for example by means of a tool known as skiving machine, for example of the type known commercially as "Fortuna 4".

Figure 11:
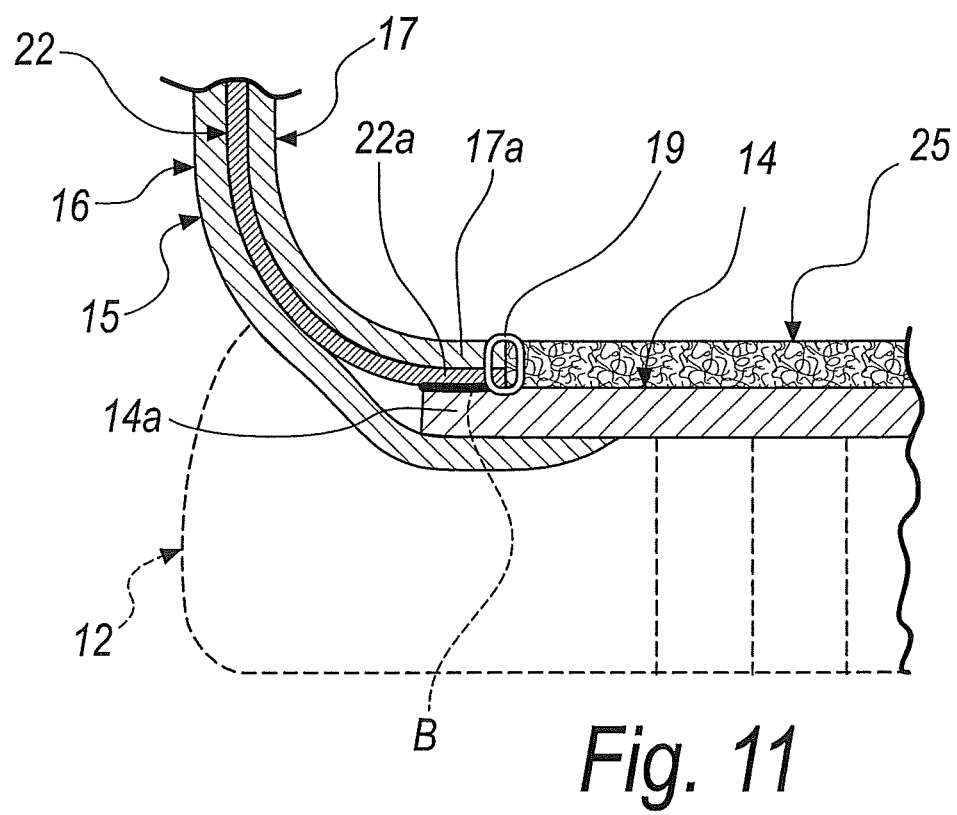

With particular reference to FIG. 11, in a seventh alternative embodiment, advantageously a vapor-permeable insole 25 is provided, which is superimposed on the structural insert 14, the lower flap 17a of the upper lining 17 and the lower edge 22a of the upper membrane 22 being joined quite coincident and associated, by means of a seam 19, conveniently of the Strobel type, perimetrically to the vapor-permeable insole 25.

The contour of the vapor-permeable insole 25 is conveniently internal to the contour of the structural insert 14 that covers its seam 19 to the lower edge 22a, to which the perimetric edge 14a of the structural insert 14 is conveniently sealed.

Moreover, the lower edge 16a of the upper 16 is advantageously folded and glued, according to the construction known as "AGO lasting", under the perimetric edge 14a of the structural insert 14.

Preferably, the vapor-permeable insole 25 is made of non-woven fabric or felt.

It should be noted that in the accompanying figures, the sealing areas

B, i.e., the interconnection regions that in a vapor-permeable shoe according to the invention provide for the waterproof sealing of the components that are mutually connected thereat, are shown schematically with a thick line.

Said thick lines are arranged so as to indicate said preferred sealing regions and in general must not be interpreted exclusively as real technical features, although they may coincide with regions where a layer of adhesive is arranged.

In practice, it has been found that the invention achieves the intended aim and objects, providing a vapor-permeable shoe whose sole is at least as strong as currently known soles and at least as effectively waterproof, allowing however greater vapor permeability.

Moreover, a vapor-permeable shoe, according to the invention, is lighter and more flexible than currently known vapor-permeable shoes, and is at least as strong, since the functional element is more flexible than the waterproof and vapor-permeable layered inserts currently used to make the soles waterproof and vapor-permeable.

A vapor-permeable shoe according to the invention further has a more comfortable sole than currently known vapor-permeable shoes and is at least as resistant, particularly to penetration and tearing.

The functional element is in fact capable of withstanding impacts and penetration by foreign objects that can penetrate through the openings of the sole.

It is further capable of supporting the foot of the user so as to limit the formation of hollows in the foot insertion region at the openings of the sole.

In this manner, the foot resting surface is substantially uniform under the pressure of said foot, avoiding the formation of hollows due to the weight of the body that bears on the structural insert, pushing it to sink through the openings of the sole, where it is not supported.

This allows, therefore, the provision of large openings in the sole.

Moreover, thanks to its characteristic of resistance to tearing of the functional element, the structural insert allows adequate tightness of the seams on its perimetric edge.

The invention thus conceived is susceptible of numerous modifications and variations, all of which are within the scope of the accompanying claims; all the details may further be replaced with other technically equivalent elements.

In practice, the materials used, so long as they are compatible with the specific use, as well as the contingent shapes and dimensions, may be any according to requirements and to the state of the art.

The disclosures in European Patent Application No. 09425335.8 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A vapor-permeable shoe comprising:
   an upper assembly that wraps around a foot insertion region and is associated, in a plantar region thereof, with a sole that includes at least one vapor-permeable or perforated portion, wherein:
   said upper assembly comprises a structural insert that includes at least one waterproof portion that is sealed impermeably to the sole, covering said at least one vapor-permeable or perforated portion, so as to prevent infiltration of liquid, through it, toward the foot insertion region;
   said waterproof portion includes at least partly a waterproof and vapor-permeable functional element that has a stratified and cohesive monolithic sheet-like structure made of a polymeric material that is impermeable to water in the liquid state and is permeable to water vapor, at least one functional portion of the functional element having a penetration resistance that is greater than approximately 10 N.

2. The vapor-permeable shoe according to claim 1, wherein said monolithic sheet-like structure includes a plurality of functional layers made of polymeric material which are impermeable to water in the liquid state and permeable to water vapor.

3. The vapor-permeable shoe according to claim 1, wherein said polymeric material is selected among expanded polytetrafluoroethylene, polyurethane, polyethylene, polypropylene, and polyester.

4. The vapor-permeable shoe according to claim 1, wherein said structural insert is structured as an assembly insole for a top assembly, said upper assembly being formed by said top assembly and by said structural insert, which is associated with said structural insert in a downward region so as to close it.

5. The vapor-permeable shoe according to claim 4, wherein said top assembly at least comprises an upper and an upper lining, a lower flap of said lining being joined to a lower edge of said upper so as to form a lower margin of said top assembly, which is associated, by a seam, perimetrically with respect to said structural insert structured as an assembly insole.

6. The vapor-permeable shoe according to claim 5, wherein said upper is folded and glued so as to cover the region for connection of said lower edge to said structural insert.

7. The vapor-permeable shoe according to claim 5, further comprising a sealing film made of thermoplastic adhesive material which covers the region for connection of said lower edge to said structural insert, said sealing film defining a seal of said sole to said waterproof portion, of said structural insert, which covers at least said vapor-permeable or perforated portion thereof, so as to prevent infiltration of liquid, through it, toward the foot insertion region.

8. The vapor-permeable shoe according to claim 4, wherein said top assembly at least comprises:
   an upper lining, a lower flap of which is associated, by a seam, perimetrically to said structural insert, which is structured like an assembly insole, and
   an upper, a lower edge of which is folded and glued so as to cover the region for connection of said lower flap to said structural insert.

9. The vapor-permeable shoe according to claim 4, wherein said top assembly at least comprises an upper and an upper lining, a lower flap of which is joined to a lower edge of said upper so as to form a lower margin of said top assembly which is folded and glued below a perimetric edge of said structural insert.

10. The vapor-permeable shoe according to claim 9, further comprising a sealing film made of thermoplastic adhesive material which covers said lower margin and a perimetric band o f said functional element of said structural insert, said sealing film defining a seal f said sole to said waterproof portion f said structural insert that covers at least said vapor-permeable or perforated portion thereof, so as to prevent infiltration of liquid, through it, toward the foot insertion region.

11. The vapor-permeable shoe according to claim 4, wherein said top assembly at least comprises:
   a vapor-permeable upper;
   a vapor-permeable upper lining, arranged so as to line said upper internally to the foot insertion region;
   a waterproof and vapor-permeable upper membrane, which is between said upper and said upper lining so as to make said top assembly waterproof and vapor-permeable, said upper membrane being sealed to said structural insert for the waterproofness of said upper assembly.

12. The vapor-permeable according to claim 11, further comprising:
   a vapor-permeable insole, which is superimposed on said structural insert, the lower flap of said upper lining and the lower edge of said upper membrane being joined and associated, by a seam, perimetrically to said vapor-permeable insole, a contour of said vapor-permeable insole being internal to a contour of said structural insert that covers said seam thereof, the lower edge of said upper being folded and glued, according to a construction of AGO lasting, under the perimetric edge of said structural insert.

13. The vapor-permeable shoe according to claim 11, wherein said upper includes, at its lower edge, a waterproof sealing element which adheres intimately so as to form a seal to the lower edge of said upper membrane.

14. The vapor-permeable shoe according to claim 13, wherein said sealing element is joined to said lower edge and to a lower flap of said upper lining so as to forma lower margin o f said top assembly, which is associated, by a seam, perimetrically with respect to said structural insert, which is structured as an assembly insole.

15. The vapor-permeable shoe according to claim 13, said sealing element is joined to said lower edge, said element and said edge being folded and glued, according to a construction of AGO lasting, below a perimetric edge of said structural insert.

16. The vapor-permeable shoe according to claim 13, wherein said lower edge and the lower flap of said upper lining are joined perimetrically to said structural insert, said sealing element being folded and glued, according to a construction of AGO lasting, under the perimetric edge of said structural insert, straddling a joint of said lower edge to said structural insert to allow their sealing.

17. The vapor-permeable shoe according to claim 12, wherein said upper includes, at its lower edge, a sealing element that is permeable to sealing material and is permeated by sealing material that grips so as to form a seal at the lower edge of said upper membrane.

18. The vapor-permeable shoe according to claim 17, wherein said sealing element is joined to said lower edge and to a lower flap of said upper lining so as to form a lower margin of said top assembly, which is associated, by a seam, perimetrically with respect to said structural insert structured as an assembly insole.

19. The vapor-permeable shoe according to claim 17, wherein said sealing element is joined to said lower edge, said sealing element and said lower edge being folded and glued, according to a construction of AGO lasting, under a perimetric edge of said structural insert.

20. The vapor-permeable shoe according to claim 17, wherein said lower edge and a lower flap of said upper lining are joined perimetrically to said structural insert, said sealing element being folded and glued, according to a construction of AGO lasting, under the perimetric edge of said structural insert so as to straddle a joint between said lower edge and the structural insert to allow their sealing.

21. The vapor-permeable shoe according to claim 11, wherein:
    said upper membrane has its lower edge joined to a lower flap of said upper lining, said lower flap and said lower edge being joined and associated, by a seam, perimetrically to said structural insert structured as an assembly insole;
    a sealing film made of thermoplastic adhesive material being provided which covers the region of connection of said lower edge to said structural insert, so as to mutually seal them;
    said upper having its lower edge folded and glued, according to a construction of AGO lasting, under the perimetric edge of said structural insert, surmounting said sealing film.

22. The vapor-permeable shoe according to claim 11, wherein:
    said upper membrane has its lower edge joined to a lower flap of said upper lining, said lower flap and said lower edge being joined and folded and glued, according to a construction of AGO lasting, under a perimetric edge of said structural insert structured as an assembly insole ;
    a sealing film made of thermoplastic adhesive material being provided which covers the region connection of said lower edge to said structural insert, so as to mutually seal them;
    said upper having its lower edge folded and glued, according to the construction of AGO lasting, under the perimetric edge of said structural insert, surmounting said sealing film.

23. The vapor-permeable shoe according to claim 22, wherein said lower flap, joined to said lower edge, is skived so as to expose said lower edge, allowing contact of said lower edge under the perimetric edge of said structural insert.

24. The vapor -permeable shoe according to claim 4, wherein said structural insert is entirely composed of said functional element.

25. The vapor-permeable shoe according to claim 4, wherein said structural insert is made of both said functional element and a material selected among leather, cellulose material, and felt.

26. The vapor-permeable shoe according to claim 1, wherein said sole includes at least one supporting element, for the structural insert, made of a material that is resistant to hydrolysis and is vapor-permeable or perforated, said structural insert being superimposed on and supported by said supporting element.

27. The vapor-permeable shoe according to claim 26, wherein said supporting element is made of a material selected among a mesh made of polymeric material, a mesh made of metallic material, felt, leather.

28. The vapor-permeable shoe according to claim 1, wherein said vapor-permeable or perforated portion is defined by at least one through opening, said sole being a single body and made of polymeric material.

29. The vapor-permeable shoe according to claim 1, wherein said vapor-permeable or perforated portion is defined by at least one through opening, said sole comprising at least one lower part made of polymeric material and including a tread and at least one upper portion made of polymeric material for connection to said upper assembly.

30. The vapor-permeable shoe according to claim 29, wherein said sole comprises at least one filler, which is vapor-permeable or diffusely perforated and lies below said functional element.

* * * * *